US012314321B1

(12) United States Patent
Shahul Hamid et al.

(10) Patent No.: US 12,314,321 B1
(45) Date of Patent: May 27, 2025

(54) AUTOMATED SELECTION OF FOUNDATION MODELS FOR CLIENT-SPECIFIC GENERATIVE ARTIFICIAL INTELLIGENCE NEEDS

(71) Applicant: International Business Machines Corporation, Armonk, NY (US)

(72) Inventors: Ahamed Jalaldeen Shahul Hamid, Bangalore (IN); Mukundan Sundararajan, Bangalore (IN); Deepak Malik, Gurgaon (IN); Hemant Singh, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/658,081

(22) Filed: May 8, 2024

(51) Int. Cl.
*G06F 16/90* (2019.01)
*G06F 16/9035* (2019.01)

(52) U.S. Cl.
CPC ................ *G06F 16/9035* (2019.01)

(58) Field of Classification Search
None
See application file for complete search history.

(56) References Cited

U.S. PATENT DOCUMENTS

| | | | | |
|---|---|---|---|---|
| 10,475,099 B1 * | 11/2019 | Nomula | ................ | G06T 19/20 |
| 10,664,500 B2 * | 5/2020 | Chang | ................ | G06F 16/5854 |
| 11,244,373 B2 * | 2/2022 | August | ................ | G06Q 30/0641 |
| 11,334,949 B2 * | 5/2022 | Kim | ................ | G06Q 30/0282 |
| 11,631,017 B2 * | 4/2023 | White | ................ | G06N 5/043 |
| | | | | 706/49 |
| 2004/0267730 A1 * | 12/2004 | Dumais | ................ | G06F 16/31 |
| 2008/0126273 A1 * | 5/2008 | Carus | ................ | G06N 20/00 |
| | | | | 706/12 |

(Continued)

FOREIGN PATENT DOCUMENTS

CN 117520514 A 2/2024

OTHER PUBLICATIONS

Anonymous, "Method and Apparatus for UI-Based Model Adapter for Foundation Models," ip.com Prior Art Database, Apr. 4, 2023, 9 pages, ip.com, accessed April 9. 2024, https://priorart.ip.com/IPCOM/000272059.

(Continued)

*Primary Examiner* — Eliyah S. Harper
(74) *Attorney, Agent, or Firm* — Yee & Associates, P.C.

(57) ABSTRACT

Automatically recommending appropriate foundation models is provided. A list of recommended foundation models, along with a corresponding ranking for each respective foundation model in the list is generated based on a corresponding attribute matching score and a justification for the corresponding ranking of each respective foundation model. The list of the recommended foundation models, along with the corresponding ranking for each respective foundation model in the list and the justification for the corresponding ranking of each respective foundation model is sent to a user. Feedback is received from the user regarding accuracy of a user-selected foundation model from the list of the recommended foundation models. The user-selected foundation model is adjusted based on the feedback received from the user regarding the accuracy of the user-selected foundation model from the list of the recommended foundation models.

20 Claims, 8 Drawing Sheets

(56) References Cited

U.S. PATENT DOCUMENTS

| | | | |
|---|---|---|---|
| 2012/0131020 A1* | 5/2012 | Nitz | G06Q 10/10 |
| | | | 707/E17.069 |
| 2013/0173583 A1* | 7/2013 | Hueter | G06F 16/41 |
| | | | 707/711 |
| 2017/0185669 A1* | 6/2017 | Chang | G06F 16/24578 |
| 2019/0286664 A1* | 9/2019 | Adams | G06N 20/00 |
| 2020/0320829 A1* | 10/2020 | Smith | G07F 17/3267 |
| 2021/0158074 A1* | 5/2021 | Wray | G06Q 10/1053 |
| 2021/0272045 A1* | 9/2021 | Reshef | G06N 20/00 |
| 2024/0337464 A1* | 10/2024 | Mencotti | F41G 3/06 |

OTHER PUBLICATIONS

Author unknown, "Choosing a foundation model in watsonx.ai," IBM Documentation, Feb. 15, 2024, 6 pages, ibm.com, https://www.ibm.com/docs/en/watsonx-as-a-service?topic=models-choosing-model.

Author unknown, "Hugging Face Foundation Models Hub," Hugging Face, 2024, huggingface.co, accessed Apr. 22, 2024, https://huggingface.co/models.

Author unknown, "IBM watsonx Foundation Models Library," IBM Products, 2024, ibm.com, accessed Apr. 22, 2024, www.ibm.com/products/watsonx-ai/foundation-models.

Author unknown, "Nuclia multi-model generative AI selection," Nuclia, 2024, 7 pages, nuclia.com, accessed Apr. 9, 2024, https://nuclia.com/generative-ai/.

Dhurandhar et al., "Ranking Large Language Models without Ground Truth," Arxiv, Feb. 21, 2024, 19 pages, arxiv.org, accessed Apr. 9, 2024, https://arxiv.org/abs/2402.14860.

Gharse, "Announcing Foundation Models in Azure Machine Learning," Microsoft Community Hub, May 23, 2023, 8 pages, Microsoft AI—Machine Learning Blog, accessed Apr. 9, 2024, https://techcommunity.microsoft.com/t5/ai-machine-learning-blog/announcing-foundation-models-in-azure-machine-learning/ba-p/3827481.

Lu et al., "A Taxonomy of Foundation Model Based Systems Through the Lens of Software Architecture," Arxiv, Jan. 22, 2024, pp. 2-14, arxiv.org, accessed Apr. 9, 2024, https://arxiv.org/abs/2305.05352.

Moss, "Supercharging the Customer Experience with AI Modeling," Concentrix, 2024, 6 pages, concentrix.com, accessed Apr. 9, 2024, https://www.concentrix.com/insights/blog/customer-experience-ai-modeling/.

* cited by examiner

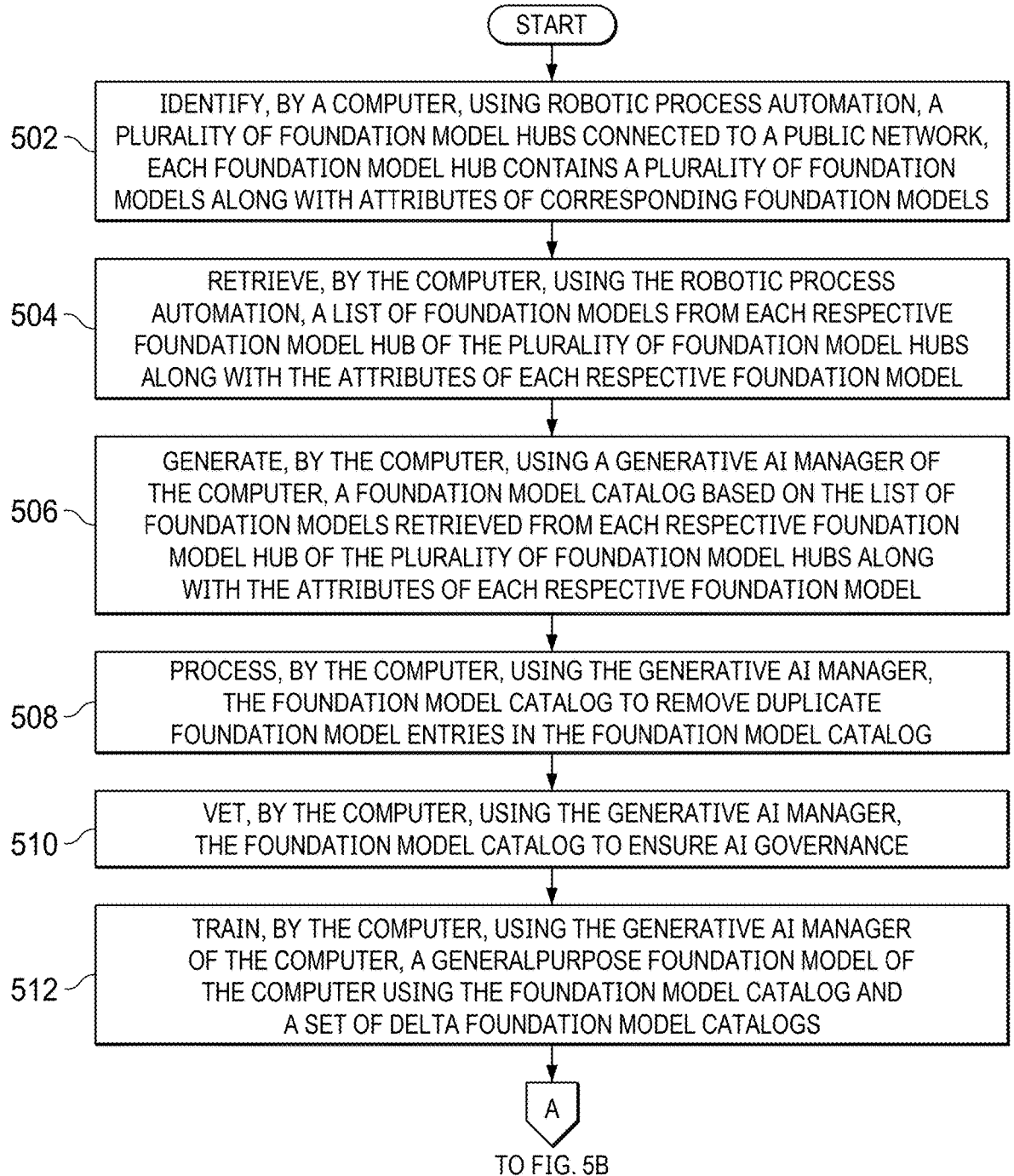

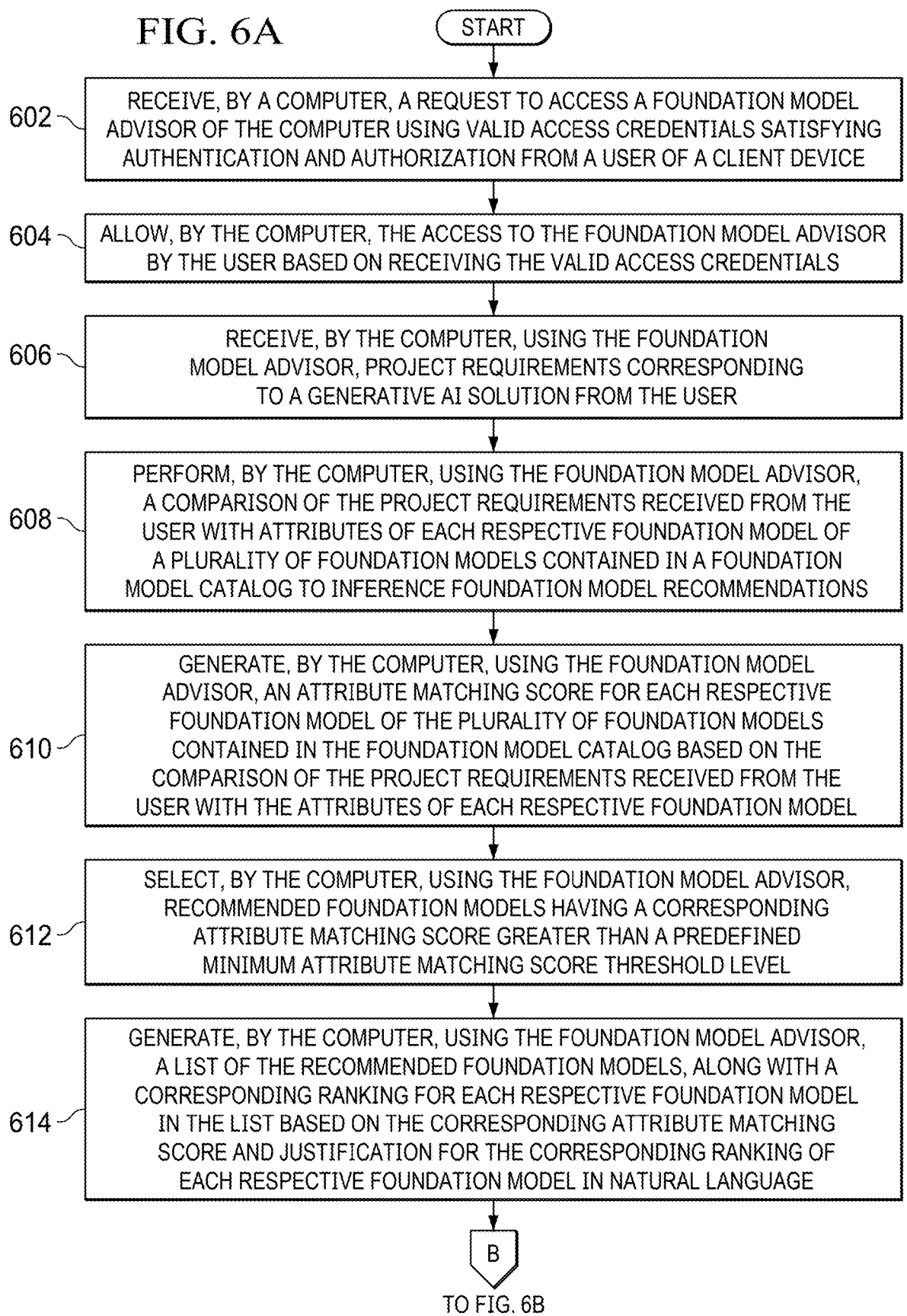

AUTOMATED SELECTION OF FOUNDATION MODELS FOR CLIENT-SPECIFIC GENERATIVE ARTIFICIAL INTELLIGENCE NEEDS

BACKGROUND

The disclosure relates generally to generative artificial intelligence and more specifically to foundation model selection for generative artificial intelligence solutions.

Generative artificial intelligence is artificial intelligence capable of generating text, images, videos, or other data using foundation models, often in response to prompts. Generative artificial intelligence models learn the patterns and structure of their corresponding input training data by applying unsupervised or self-supervised machine learning and then generate new data that has similar characteristics. In other words, generative artificial intelligence can learn from existing artifacts to generate new, realistic artifacts (i.e., at scale) that reflect the characteristics of the training data, but does not repeat the training data. Generative artificial intelligence uses foundation models, which are machine learning or deep learning models trained on a broad set of unlabeled data that can be used for a wide variety of different tasks, such as, for example, image classification, natural language processing, generating text and images, conversing in natural language, question-answering, and the like, with or without additional fine-tuning.

SUMMARY

According to one illustrative embodiment, a computer-implemented method for automatically recommending appropriate foundation models is provided. A computer, using a foundation model advisor, generates a list of recommended foundation models, along with a corresponding ranking for each respective foundation model in the list based on a corresponding attribute matching score and a justification for the corresponding ranking of each respective foundation model. The computer, using the foundation model advisor, sends the list of the recommended foundation models, along with the corresponding ranking for each respective foundation model in the list and the justification for the corresponding ranking of each respective foundation model to a user. The computer, using the foundation model advisor, receives feedback from the user regarding accuracy of a user-selected foundation model from the list of the recommended foundation models. The computer, using a generative AI manager, adjusts the user-selected foundation model based on the feedback received from the user regarding the accuracy of the user-selected foundation model from the list of the recommended foundation models. According to other illustrative embodiments, a computer system and computer program product for automatically recommending appropriate foundation models are provided.

BRIEF DESCRIPTION OF THE DRAWINGS

FIGS. 5A-5B are a flowchart illustrating a process for implementing a foundation model advisor in accordance with an illustrative embodiment; and FIGS. 6A-6B are a flowchart illustrating a process for automatically recommending appropriate foundation models for generative artificial intelligence solution development in accordance with an illustrative embodiment.

DETAILED DESCRIPTION

Figure 1:
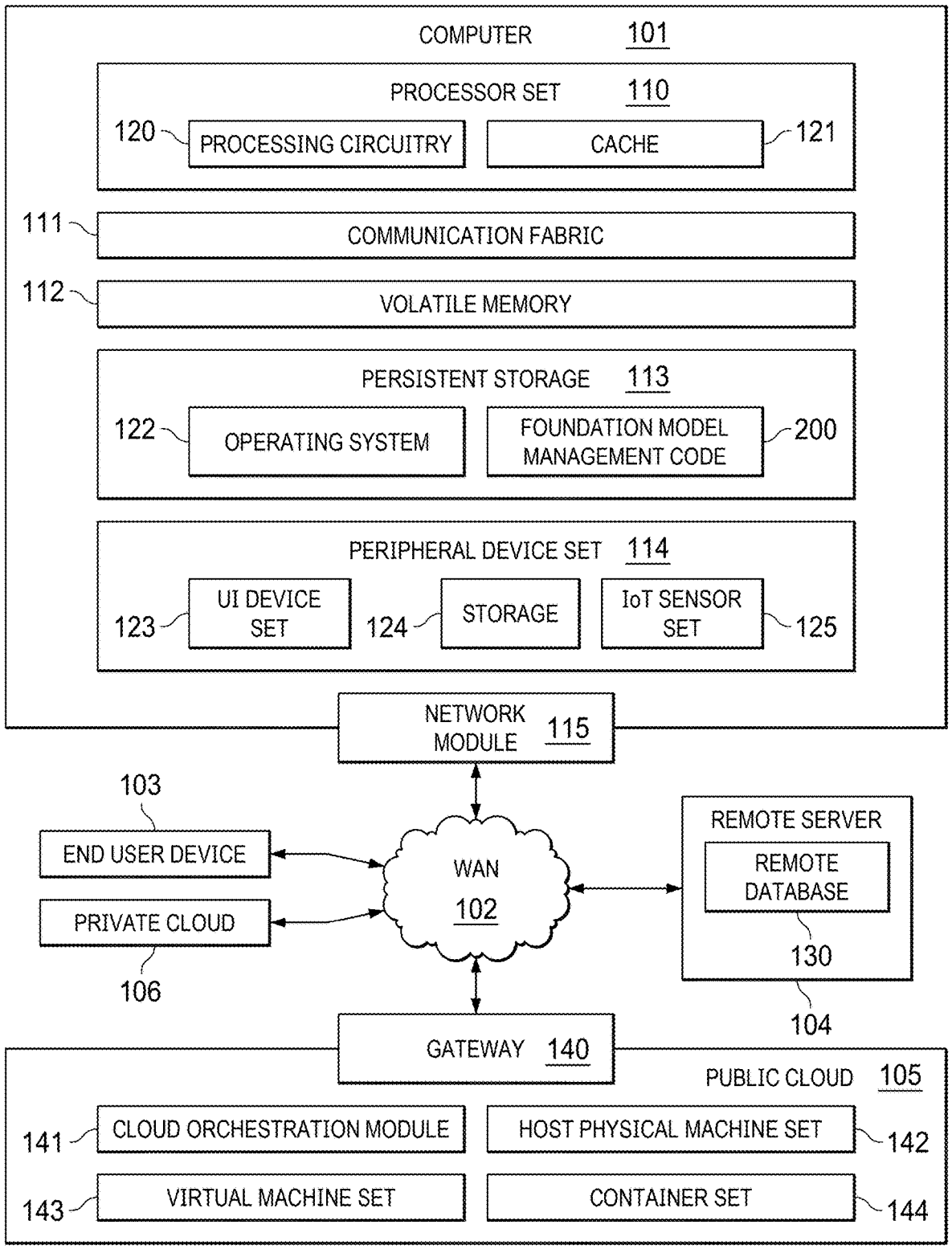
FIG. 1 is a pictorial representation of a computing environment in which illustrative embodiments may be implemented.

A computer-implemented method provides automatically recommending appropriate foundation models. A computer, using a foundation model advisor, generates a list of recommended foundation models, along with a corresponding ranking for each respective foundation model in the list based on a corresponding attribute matching score and a justification for the corresponding ranking of each respective foundation model. The computer, using the foundation model advisor, sends the list of the recommended foundation models, along with the corresponding ranking for each respective foundation model in the list and the justification for the corresponding ranking of each respective foundation model to a user. The computer, using the foundation model advisor, receives feedback from the user regarding accuracy of a user-selected foundation model from the list of the recommended foundation models. The computer, using a generative AI manager, adjusts the user-selected foundation model based on the feedback received from the user regarding the accuracy of the user-selected foundation model from the list of the recommended foundation models. As a result, illustrative embodiments provide a technical effect of automatically recommending a list of appropriate foundation models with justifications for selecting each particular foundation model in the list, which decreases the risk of incorrect foundation model selection for user-specific generative AI solution needs, and adjusting a user-selected foundation model from the list based on feedback received from the user regarding the accuracy of the user-selected foundation model to meet the user-specific generative AI solution needs.

Also, the computer, using the generative AI manager, deploys the user-selected foundation model on a client device of the user to develop a generative AI solution in response to adjusting the user-selected foundation model based on the feedback. As a result, illustrative embodiments provide a technical effect of automatically deploying the user-selected foundation model on a client device of the user to develop a generative AI solution.

In addition, the computer, using the foundation model advisor, receives project requirements corresponding to a generative AI solution from the user. The computer, using the foundation model advisor, performs a comparison of the project requirements received from the user with attributes of each respective foundation model of a plurality of foundation models contained in a foundation model catalog. As a result, illustrative embodiments provide a technical effect of performing a comparison of the project requirements received from the user with attributes of each respective foundation model of a plurality of foundation models contained in a foundation model catalog.

Further, the computer, using the foundation model advisor, generates an attribute matching score for each respective foundation model of the plurality of foundation models contained in the foundation model catalog based on the comparison of the project requirements received from the user with the attributes of each respective foundation model. The computer, using the foundation model advisor, selects the recommended foundation models having the corresponding attribute matching score greater than a predefined minimum attribute matching score threshold level. As a result, illustrative embodiments provide a technical effect of selecting recommended foundation models having a corresponding attribute matching score greater than a predefined minimum attribute matching score threshold level.

Furthermore, the computer, using robotic process automation, identifies a plurality of foundation model hubs, each foundation model hub contains a plurality of foundation models along with attributes of corresponding foundation models. The computer, using the robotic process automation, retrieves a list of foundation models from each respective foundation model hub of the plurality of foundation model hubs along with the attributes of each respective foundation model in response to identifying the plurality of foundation model hubs. The computer, using the generative AI manager of the computer, generates a foundation model catalog based on the list of foundation models retrieved from each respective foundation model hub of the plurality of foundation model hubs along with the attributes of each respective foundation model. As a result, illustrative embodiments provide a technical effect of generating a foundation model catalog based on a list of foundation models retrieved from each respective foundation model hub of the plurality of foundation model hubs along with the attributes of each respective foundation model.

Moreover, the computer, using the generative AI manager of the computer, trains a general-purpose foundation model of the computer using the foundation model catalog. As a result, illustrative embodiments provide a technical effect of training a general-purpose foundation model using the foundation model catalog.

The computer, using the generative AI manager of the computer, also implements the foundation model advisor of the computer based on the general-purpose foundation model that was trained with the foundation model catalog. The computer, using the generative AI manager of the computer, adds the general-purpose foundation model to the foundation model advisor of the computer. As a result, illustrative embodiments provide a technical effect of adding the general-purpose foundation model, which was trained with the foundation model catalog, to the foundation model advisor.

In addition, the computer utilizes the foundation model advisor to generate the list of the recommended foundation models in accordance with received project requirements, along with a ranking corresponding to each particular foundation model in the list, and the justification in natural language for the ranking of each particular foundation model. As a result, illustrative embodiments provide a technical effect of generating the list of the recommended foundation models in accordance with received project requirements, along with a ranking corresponding to each particular foundation model in the list, and the justification in natural language for the ranking of each particular foundation model.

A computer system for automatically recommending appropriate foundation models comprises a communication fabric, a set of computer-readable storage media connected to the communication fabric, where the set of computer-readable storage media collectively stores program instructions, and a set of processors connected to the communication fabric, where the set of processors executes the program instructions. The computer system, using a foundation model advisor, generates a list of recommended foundation models, along with a corresponding ranking for each respective foundation model in the list based on a corresponding attribute matching score and a justification for the corresponding ranking of each respective foundation model. The computer system, using the foundation model advisor, sends the list of the recommended foundation models, along with the corresponding ranking for each respective foundation model in the list and the justification for the corresponding ranking of each respective foundation model to a user. The computer system, using the foundation model advisor, receives feedback from the user regarding accuracy of a user-selected foundation model from the list of the recommended foundation models. The computer system, using a generative AI manager, adjusts the user-selected foundation model based on the feedback received from the user regarding the accuracy of the user-selected foundation model from the list of the recommended foundation models. As a result, illustrative embodiments provide a technical effect of automatically recommending a list of appropriate foundation models with justifications for selecting each particular foundation model in the list, which decreases the risk of incorrect foundation model selection for user-specific generative AI solution needs, and adjusting a user-selected foundation model from the list based on feedback received from the user regarding the accuracy of the user-selected foundation model to meet the user-specific generative AI solution needs.

Also, the computer system, using the generative AI manager, deploys the user-selected foundation model on a client device of the user to develop a generative AI solution in response to adjusting the user-selected foundation model based on the feedback. As a result, illustrative embodiments provide a technical effect of automatically deploying the user-selected foundation model on a client device of the user to develop a generative AI solution.

In addition, the computer system, using the foundation model advisor, receives project requirements corresponding to a generative AI solution from the user. The computer system, using the foundation model advisor, performs a comparison of the project requirements received from the user with attributes of each respective foundation model of a plurality of foundation models contained in a foundation model catalog. As a result, illustrative embodiments provide a technical effect of performing a comparison of the project requirements received from the user with attributes of each respective foundation model of a plurality of foundation models contained in a foundation model catalog.

Further, the computer system, using the foundation model advisor, generates an attribute matching score for each respective foundation model of the plurality of foundation models contained in the foundation model catalog based on the comparison of the project requirements received from the user with the attributes of each respective foundation model. The computer system, using the foundation model advisor, selects the recommended foundation models having the corresponding attribute matching score greater than a predefined minimum attribute matching score threshold level. As a result, illustrative embodiments provide a technical effect of selecting recommended foundation models having a corresponding attribute matching score greater than a predefined minimum attribute matching score threshold level.

Furthermore, the computer system, using robotic process automation, identifies a plurality of foundation model hubs, each foundation model hub contains a plurality of foundation models along with attributes of corresponding foundation models. The computer system, using the robotic process automation, retrieves a list of foundation models from each respective foundation model hub of the plurality of foundation model hubs along with the attributes of each respective foundation model in response to identifying the plurality of foundation model hubs. The computer system, using the generative AI manager of the computer system, generates a foundation model catalog based on the list of foundation models retrieved from each respective foundation model hub of the plurality of foundation model hubs along with the attributes of each respective foundation model. As a result, illustrative embodiments provide a technical effect of generating a foundation model catalog based on a list of foundation models retrieved from each respective foundation model hub of the plurality of foundation model hubs along with the attributes of each respective foundation model.

Moreover, the computer system, using the generative AI manager of the computer, trains a general-purpose foundation model of the computer system using the foundation model catalog. As a result, illustrative embodiments provide a technical effect of training a general-purpose foundation model using the foundation model catalog.

A computer program product for automatically recommending appropriate foundation models comprises a set of computer-readable storage media having program instructions collectively stored therein, the program instructions executable by a computer. The computer, using a foundation model advisor, generates a list of recommended foundation models, along with a corresponding ranking for each respective foundation model in the list based on a corresponding attribute matching score and a justification for the corresponding ranking of each respective foundation model. The computer, using the foundation model advisor, sends the list of the recommended foundation models, along with the corresponding ranking for each respective foundation model in the list and the justification for the corresponding ranking of each respective foundation model to a user. The computer, using the foundation model advisor, receives feedback from the user regarding accuracy of a user-selected foundation model from the list of the recommended foundation models. The computer, using a generative AI manager, adjusts the user-selected foundation model based on the feedback received from the user regarding the accuracy of the user-selected foundation model from the list of the recommended foundation models. As a result, illustrative embodiments provide a technical effect of automatically recommending a list of appropriate foundation models with justifications for selecting each particular foundation model in the list, which decreases the risk of incorrect foundation model selection for user-specific generative AI solution needs, and adjusting a user-selected foundation model from the list based on feedback received from the user regarding the accuracy of the user-selected foundation model to meet the user-specific generative AI solution needs.

Also, the computer, using the generative AI manager, deploys the user-selected foundation model on a client device of the user to develop a generative AI solution in response to adjusting the user-selected foundation model based on the feedback. As a result, illustrative embodiments provide a technical effect of automatically deploying the user-selected foundation model on a client device of the user to develop a generative AI solution.

In addition, the computer, using the foundation model advisor, receives project requirements corresponding to a generative AI solution from the user. The computer, using the foundation model advisor, performs a comparison of the project requirements received from the user with attributes of each respective foundation model of a plurality of foundation models contained in a foundation model catalog. As a result, illustrative embodiments provide a technical effect of performing a comparison of the project requirements received from the user with attributes of each respective foundation model of a plurality of foundation models contained in a foundation model catalog.

Further, the computer, using the foundation model advisor, generates an attribute matching score for each respective foundation model of the plurality of foundation models contained in the foundation model catalog based on the comparison of the project requirements received from the user with the attributes of each respective foundation model. The computer, using the foundation model advisor, selects the recommended foundation models having the corresponding attribute matching score greater than a predefined minimum attribute matching score threshold level. As a result, illustrative embodiments provide a technical effect of selecting recommended foundation models having a corresponding attribute matching score greater than a predefined minimum attribute matching score threshold level.

Furthermore, the computer, using robotic process automation, identifies a plurality of foundation model hubs, each foundation model hub contains a plurality of foundation models along with attributes of corresponding foundation models. The computer, using the robotic process automation, retrieves a list of foundation models from each respective foundation model hub of the plurality of foundation model hubs along with the attributes of each respective foundation model in response to identifying the plurality of foundation model hubs. The computer, using the generative AI manager of the computer, generates a foundation model catalog based on the list of foundation models retrieved from each respective foundation model hub of the plurality of foundation model hubs along with the attributes of each respective foundation model. As a result, illustrative embodiments provide a technical effect of generating a foundation model catalog based on a list of foundation models retrieved from each respective foundation model hub of the plurality of foundation model hubs along with the attributes of each respective foundation model.

Moreover, the computer, using the generative AI manager of the computer, trains a general-purpose foundation model of the computer using the foundation model catalog. As a result, illustrative embodiments provide a technical effect of training a general-purpose foundation model using the foundation model catalog.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as foundation model management code 200. For example, foundation model management code 200 identifies a plurality of foundation model hubs, repositories, and libraries corresponding to various independent software vendors, open-source software communities, and entities that want to share their foundation models in the public domain (e.g., a public network, such as the Internet). Foundation model management code 200 retrieves a list of foundation models, along with the attributes (e.g., metadata) corresponding to each foundation model in the list, from each of the plurality of foundation model hubs using, for example, robotic process automation or the like. Robotic process automation uses intelligent automation technologies, such as, for example, software robots, artificial intelligence agents, or the like, to execute tasks automatically.

Foundation model management code 200 generates a foundation model catalog based on the list of foundation models, along with the attributes corresponding to each foundation model in the list, which foundation model management code 200 retrieved from each of the plurality of public foundation model hubs. Foundation model management code 200 analyzes and processes the foundation model catalog to eliminate duplicate foundation model entries, ensure accuracy of foundation model attributes, and enforce artificial intelligences (AI) governance.

Foundation model management code 200 trains a general-purpose foundation model with the foundation model catalog using a generative AI manager implemented by foundation model management code 200. Foundation model management code 200 fine-tunes or adjusts the general-purpose foundation model based on additional attributes and categorizes the general-purpose foundation model based on the various attributes of each foundation model in the foundation model catalog using the generative AI manager of foundation model management code 200. The various attributes include, for example, industry such as banking, financial, educational, healthcare, entertainment, retail business, or the like for which a particular foundation model was pretrained, whether that particular foundation model is fine-tunable, whether that particular foundation model supports cloud deployment, on-premises deployment, or both cloud and on-premises deployments, which cloud service providers can support that particular foundation model out-of-the-box, size of that particular foundation model, rating of that particular foundation model among a predetermined number of top-rated foundation models, and the like.

In addition, on a predefined time interval basis, foundation model management code 200, using robotic process automation, retrieves a list of new foundation models and modified existing foundation models, along with the attributes (e.g., metadata) corresponding to each foundation model in the list, from the plurality of foundation model hubs to generate a delta foundation model catalog. Foundation model management code 200, in response to periodically retrieving a list of new and modified foundation models, retrains the general-purpose foundation model with the delta foundation model catalog containing the new and modified foundation models. Foundation model management code 200 utilizes retrieval-augmented generation to augment a list of recommended foundation models with a list of new or modified foundation models that were added after or modified after a most recent processing of the delta foundation model catalog before sending the list of recommended foundation models to the client.

Retrieval-augmented generation is a process for optimizing the output of foundation model management code 200 so that foundation model management code 200 references one or more external knowledgebases before generating a response. Retrieval-augmented generation extends the capabilities of foundation model management code 200 to, for example, a specific industry, a client's internal knowledgebase, or the like. Using retrieval-augmented generation, foundation model management code 200 can leverage a source of newer information for more informed foundation model recommendations. In other words, retrieval-augmented generation can retrieve data from one or more external knowledgebases to ground foundation model management code 200 on the most accurate, up-to-date information (i.e., a list of new and modified foundation models contained in one or more other foundation model hubs).

Foundation model management code 200 generates a foundation model advisor that includes a user interface, natural language-based search capability, user feedback mechanism, and the like. Foundation model management code 200 integrates the general-purpose foundation model, which foundation model management code 200 trained with the foundation model catalog and retrained with the delta foundation model catalog, into the foundation model advisor. Foundation model management code 200 adds the foundation model advisor functionality to the generative AI manager using generative AI studio software (e.g., IBM® watsonx.ai) of foundation model management code 200.

Thus, the foundation model advisor is a generative AI-based digital assistant that recommends a list of appropriate foundation models for developing generative AI solutions according to client-specific needs and preferences. However, it should be noted that alternatively a generative AI development team can create the foundation model advisor and integrate the general-purpose foundation model trained on the foundation model catalog and the delta foundation model catalog into the foundation model advisor through the generative AI manager.

As a result, foundation model management code 200 decreases the risk of incorrect foundation model selection for client-specific generative AI solution needs, decreases cost, and decreases time spent. Moreover, foundation model management code 200 increases foundation model selection accuracy by providing a rationale, explanation, or justification for selecting a particular foundation model that is most appropriate for client-specific generative AI solution needs.

In addition to foundation model management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and foundation model management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, smart phone, smart watch or other wearable computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in foundation model management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user who utilizes the foundation model management services provided by computer 101), and may take any of the forms discussed above in connection with computer 101. EUD 103 typically receives helpful and useful data from the operations of computer 101. For example, in a hypothetical case where computer 101 is designed to provide a foundation model recommendation to the end user, this recommendation would typically be communicated from network module 115 of computer 101 through WAN 102 to EUD 103. In this way, EUD 103 can display, or otherwise present, the foundation model recommendation to the end user. In some embodiments, EUD 103 may be a client device, such as a thin client, heavy client, mainframe computer, desktop computer, laptop computer, tablet computer, smart phone, smart watch, smart television, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a foundation model recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Due to the emergence of generative AI, various groups, such as independent software vendors, open-source software communities, and entities (e.g., enterprises, businesses, companies, organizations, institutions, agencies, and the like), have generated numerous foundation models. In addition, these various groups also frequently release new foundation models and modified existing foundation models with enhanced capabilities. Potential consumers access these foundation models through foundation model hubs, repositories, libraries, and the like. The number of these foundation model hubs, repositories, and libraries is expected to significantly increase over time.

Selection of an appropriate foundation model is important for the success of client-specific generative AI solutions. Proliferation of foundation models in foundation model hubs, repositories, and libraries has made selection of an appropriate foundation model for any client-specific generative AI solution challenging. For example, one foundation model hub can contain 350,000 or more foundation models. Many of these foundation models can also be available through other foundation model hubs. As a result, the same foundation models can be available through multiple foundation model hubs, which adds complexity to the selection of the most appropriate foundation models for a client-specific generative AI solution need.

Currently, significant user-effort is needed for selection of appropriate foundation models for client-specific generative AI solution needs, which can result in incorrect foundation model outcomes, increased costs, and increased time spent. Furthermore, generative AI solution providers cannot provide justifications to their clients regarding the selection of particular foundation models for their client-specific generative AI solution needs. Illustrative embodiments automatically select the most appropriate foundation model for client-specific generative AI solution needs and provide justification for the selection of each particular foundation model.

Illustrative embodiments identify a plurality of foundation model hubs, repositories, and libraries in the public domain (e.g., foundation model hubs, repositories, and libraries connected to the Internet). For example, independent software vendors, open-source software communities, and entities that want to share their foundation models with foundation model consumers, publish their foundation models in corresponding foundation model hubs, repositories, and libraries in the public domain. Illustrative embodiments then identify these foundation model hubs, repositories, and libraries of the various independent software vendors, open-source software communities, and entities. In addition, illustrative embodiments, on a periodic basis, identify any newly added foundation model hubs, repositories, and libraries to the public domain.

Illustrative embodiments retrieve a list of foundation models from each of the plurality of foundation model hubs, repositories, and libraries. Illustrative embodiments utilize a foundation model aggregator, which is a robotic process automation-based tool, to retrieve the list of foundation models, along with corresponding foundation model attributes, from each foundation model hub, repository, and library. Illustrative embodiments then generate a foundation model catalog based on the list of foundation models retrieved from each of the plurality of foundation model hubs, repositories, and libraries. Illustrative embodiments also include in the foundation model catalog the attributes of each respective foundation model contained in the foundation model catalog. Illustrative embodiments also utilize the foundation model aggregator to retrieve a list of newly added and modified foundation models from the plurality of foundation model hubs, repositories, and libraries on a periodic basis. Consequently, illustrative embodiments, on a predefined time interval, generate a delta foundation model catalog containing any new and modified foundation models, along with their corresponding foundation model attributes.

Illustrative embodiments analyze and process the foundation model catalog. For example, due to partnerships between certain independent software vendors, open-source software communities, and entities, the same foundation models can exist in more than one foundation model hub, repository, or library. Illustrative embodiments process the foundation model catalog to cleanse or remove duplicate entries and ensure accuracy of foundation models, along with their corresponding attributes, in the foundation model catalog. Illustrative embodiments, using a generative AI manager, vet the foundation model catalog to ensure that the foundation model catalog is unbiased, has no hallucinations, is peer-reviewed, and is generated using quality sources (e.g., foundation model hubs, repositories, and libraries corresponding to reliable independent software vendors, open-source software communities, and entities that want to share their foundation models) to enforce AI governance. Due to periodic processing, new and modified foundation models in the delta foundation model catalog will be relatively small at any given time. Illustrative embodiments, utilizing the generative AI manager, analyze, process, and vet the delta foundation model catalog to ensure that the new and modified foundation models in the delta foundation model catalog are unbiased, have no hallucinations, are peer-reviewed, and are retrieved from quality sources to enforce AI governance.

Illustrative embodiments train a general-purpose foundation model with the foundation model catalog. Illustrative embodiments select a general-purpose foundation model that can be trained with the foundation model catalog. Illustrative embodiments also retrain the general-purpose foundation model with a delta foundation model catalog periodically. Illustrative embodiments retrain the general-purpose foundation model with a delta foundation model catalog of new and modified foundation models on periodic basis as illustrative embodiments generate new delta foundation model catalogs over time.

Illustrative embodiments fine-tune the general-purpose foundation model with additional attributes. Illustrative embodiments fine-tune the general-purpose foundation model with the additional attributes and classify the general-purpose foundation model based on various attributes corresponding to each respective foundation model included in the foundation model catalog. The various attributes include, for example, the industry for which a particular foundation model was pretrained, whether that particular foundation model is fine-tunable, whether that particular foundation model supports cloud deployment, on-premises deployment, or both cloud and on-premises deployments, which cloud service providers support that particular foundation model out-of-the-box, size of that particular foundation model, rating of that particular foundation model among a list of top-rated foundation models, and the like.

Illustrative embodiments utilize retrieval-augmented generation to find and add new foundation models to the foundation model catalog. For example, on a predefined periodic basis, illustrative embodiments utilize retrieval-augmented generation to search the plurality of foundation model hubs, repositories, and libraries to identify a list of any new or modified foundation models that were recently added to the plurality of foundation model hubs, repositories, and libraries after a most recent update to the foundation model catalog. Illustrative embodiments utilize retrieval-augmented generation to augment the list of recommended foundation models with a list of any new or modified foundation models that correspond to the client-specific generative AI solution needs prior to sending the list to the client.

Illustrative embodiments generate a foundation model advisor, which is a generative AI-based digital assistant. Illustrative embodiments utilize a generative AI manager to implement the foundation model advisor based on the general-purpose foundation model. The foundation model advisor provides a user interface, natural language-based search capability using categories and attributes of the foundational models, and a user feedback mechanism for users to provide feedback on recommended foundation models against client-specific generative AI project needs and preferences. Illustrative embodiments integrate the general-purpose foundation model, which illustrative embodiments trained using the foundation model catalog, into the foundation model advisor. Illustrative embodiments add the functionality of the foundation model advisor to the generative AI studio software (e.g., IBM watsonx.ai) using the generative AI manager of illustrative embodiments. The foundation model advisor generates a list of recommended foundation models that meet client-specific generative AI solution needs, along with a ranking corresponding to each particular foundation model in the list, and a justification in natural language for the selection and ranking of each particular foundation model.

As an illustrative example scenario, a client in the retail industry wants to develop a generative AI solution to optimize operations in the client's stores and warehouses. Project team members of the client do not know which foundation model or foundation models would be appropriate for the client-specific needs to develop the generative AI solution for optimizing operations in the client's stores and warehouses. As a result, in this illustrative example, a project team member uses the foundation model advisor of illustrative embodiments to identify a list of most appropriate foundation models for developing the generative AI solution based on the specific needs and preferences of the retail client.

The project team member of the retail client accesses the foundation model advisor using access credentials, which satisfy authentication and authorization. Afterward, the project team member inputs the client-specific generative AI solution needs (e.g., developing the generative AI solution for optimizing operations in stores and warehouses) into a user interface of the foundation model advisor via text and/or voice. In response to receiving the client-specific needs from the project team member, the foundation model advisor uses the client-specific generative AI solution needs with the attributes of each respective foundation model contained in the foundation model catalog to inference the foundation model trained with foundation model catalog. Based on the outcome of the inference, the foundation model advisor generates a matching score for each respective foundation model contained in the foundation model catalog. Afterward, the foundation model advisor selects a list of most appropriate foundation models having a corresponding matching score above a defined minimum matching score threshold level (e.g., >75% matching score). The foundation model advisor then generates a list containing the list of most appropriate foundation models that meets the client-specific generative AI solution needs, along with a corresponding ranking for each respective foundation model in the list based on the corresponding matching score and a justification (e.g., a rationale, reason, or explanation) for selecting each respective foundation model in the list.

The foundation model advisor outputs the list of most appropriate foundation models to the project team member. The project team member selects a foundation model from the list of most appropriate foundation models and provides feedback to the foundation model advisor regarding accuracy of the selected foundation model on meeting the client-specific generative AI solution needs. Based on the feedback received from the project team member, the generative AI manager fine-tunes the selected foundation model. Then, in response to fine-tuning the selected foundation model based on the feedback, the generative AI manager deploys the selected foundation model to a platform (e.g., a mainframe computer, a server computer, a desktop computer, a laptop computer, a tablet computer, a smart phone, augmented reality device, virtual reality device, or the like) corresponding to the client to develop the generative AI solution to optimize operations in the client's stores and warehouses.

Thus, illustrative embodiments provide one or more technical solutions that overcome a technical problem with an inability of current solutions to automatically select a list of most appropriate foundation models in accordance with client-specific generative AI solution needs to develop generative AI solutions for clients. As a result, these one or more technical solutions provide a technical effect and practical application in the field of generative artificial intelligence.

Figure 2:
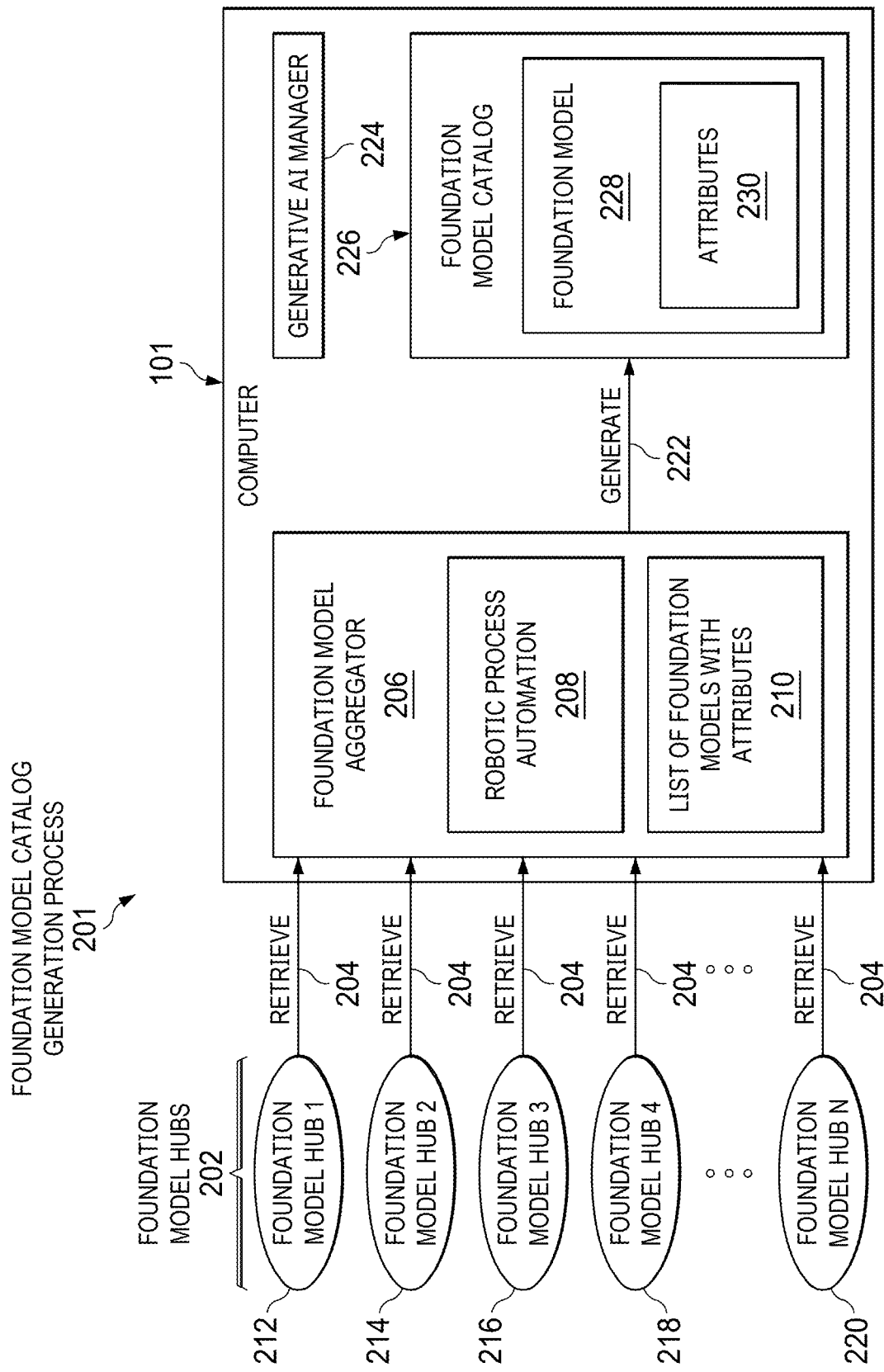
FIG. 2 is a diagram illustrating an example of a foundation model catalog generation process in accordance with an illustrative embodiment.

With reference now to FIG. 2, a diagram illustrating an example of a foundation model catalog generation process is depicted in accordance with an illustrative embodiment. Foundation model catalog generation process 201 is implemented in computer 101.

In this example, foundation model catalog generation process 201 includes foundation model hubs 202. At 204, foundation model aggregator 206 of computer 101 utilizes robotic process automation 208 to retrieve list of foundation models with attributes 210 from foundation model hubs 202, which include foundation model hub 1 212, foundation model hub 2 214, foundation model hub 3 216, foundation model hub 4 218, to foundation model hub "N" 220. However, it should be noted that foundation model hubs 202 are intended as examples only and not as a limitation on illustrative embodiments. For example, foundation model hubs 202 can include any number of foundation model hubs. Also, it should be noted that foundation model hubs 202 correspond to various independent software vendors, open-source software communities, entities, and the like that want to share foundation models in the public domain.

At 222, generative AI manager 224, utilizing robotic process automation 208 of foundation model aggregator 206, generates foundation model catalog 226 based on list of foundation models with attributes 210 retrieved from each of foundation model hub 1 212, foundation model hub 2 214, foundation model hub 3 216, foundation model hub 4 218, and foundation model hub N 220. Generative AI manager 224 can be implemented by, for example, foundation model management code 200 in FIG. 1.

Foundation model catalog 226 includes details of foundation model 228. Foundation model 228 represents a plurality of different types of foundation models corresponding to a plurality of different types of industries. Foundation model catalog 226 also includes attributes 230 corresponding to foundation model 228 Attributes 230 identify different characteristics, features, or traits of foundation model 228, such as, for example, the industry that foundation model 228 was pretrained for, whether foundation model 227 is fine-tunable, whether foundation model 228 supports cloud deployment, on-premises deployment, or both cloud and on-premises deployments, which cloud service providers support foundation model 228 out-of-the-box, size of foundation model 228, rating of foundation model 228 among a list of top-rated foundation models, and the like.

Figure 3:
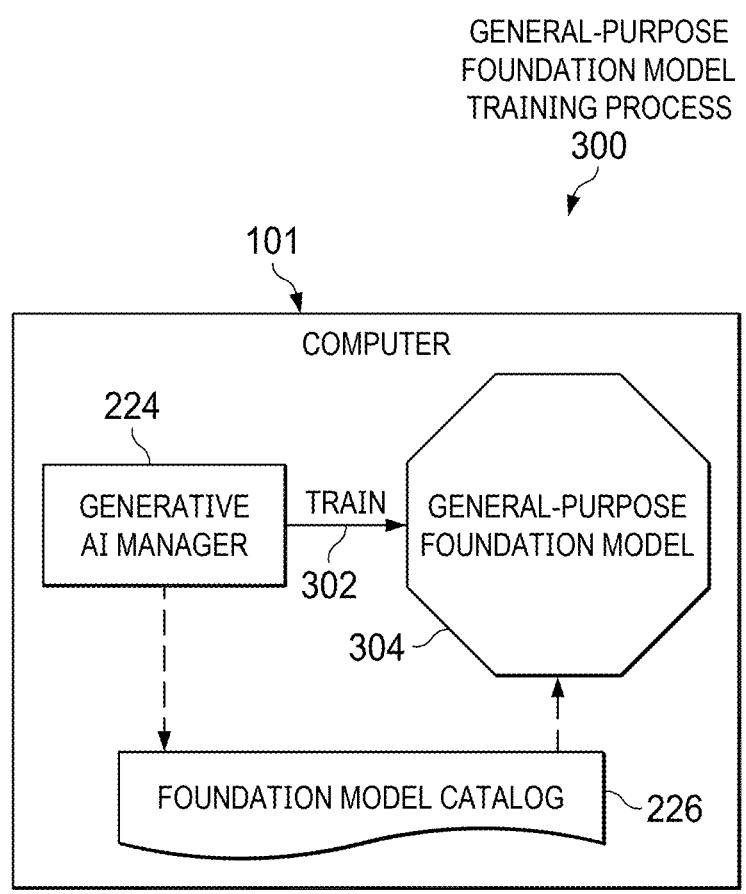
FIG. 3 is a diagram illustrating an example of a general-purpose foundation model training process in accordance with an illustrative embodiment.

With reference now to FIG. 3, a diagram illustrating an example of a general-purpose foundation model training process is depicted in accordance with an illustrative embodiment. General-purpose foundation model training process 300 is implemented in computer 101. At 302, generative AI manager 224 of computer 101 trains general-purpose foundation model 304 using foundation model catalog 226.

Figure 4:
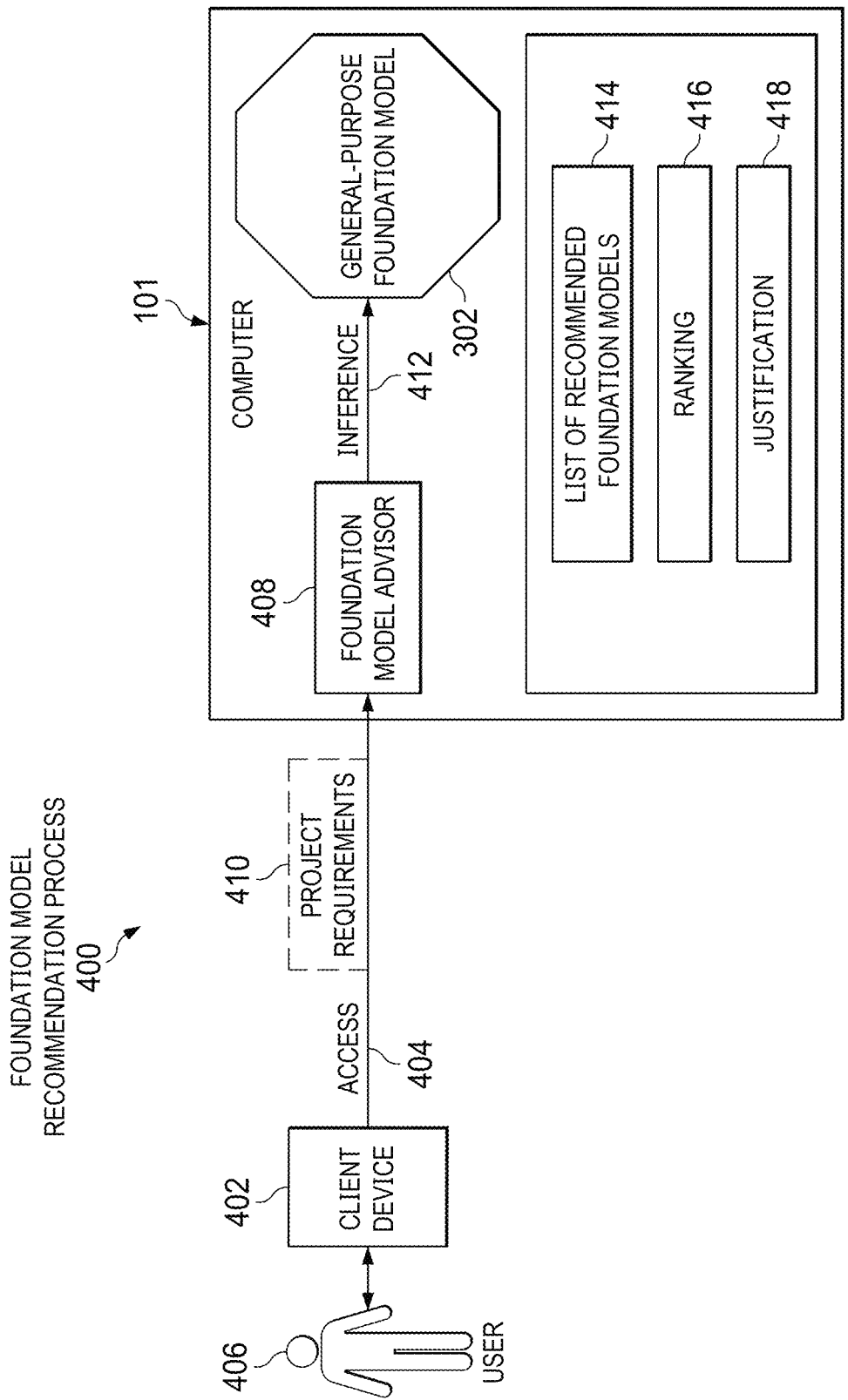
FIG. 4 is a diagram illustrating an example of a foundation model recommendation process in accordance with an illustrative embodiment.

With reference now to FIG. 4, a diagram illustrating an example of a foundation model recommendation process is depicted in accordance with an illustrative embodiment. Foundation model recommendation process 400 is implemented in computer 101. Foundation model recommendation process 400 also includes client device 402. Client device 402 can be, for example, EUD 103 in FIG. 1.

At 404, user 406 accesses foundation model advisor 408 of computer 101 via client device 402 using valid access credentials. After accessing foundation model advisor 408, user 406 sends project requirements 410 to foundation model advisor 408. Project requirements 410 include, for example, type of industry (e.g., business, retail, entertainment, education, healthcare, banking, finance, or the like) that user 406 will use the generative AI solution for, functions or tasks (e.g., image processing, natural language processing, image generation, text generation, natural language conversation, question-answering, or the like) that the generative AI solution will perform, type and size of foundation model that user 406 desires, type of dataset used to train a foundation model desired by user 406, and the like.

At 412, in response to receiving project requirements 410, foundation model advisor 408 inferences general-purpose foundation model 302, which is trained with a foundation model catalog and delta foundation model catalogs, to generate list of recommended foundation models 414 based on project requirements 410. It should be noted that computer 101 trained general-purpose foundation model 302 on a foundation model catalog, such as foundation model catalog 226 in FIG. 3. Each foundation model in list of recommended foundation models 414 includes a set of attributes that most closely match project requirements 410 based on corresponding attribute matching scores of each foundation model being greater than a predefined minimum attribute matching score threshold level (e.g., >70%, 75%, 80%, 85%, 90%, or the like attribute matching score).

List of recommended foundation models 414 also includes ranking 416 and justification 418. Ranking 416 indicates a rank of each particular foundation model in list of recommended foundation models 414 based on that particular foundation model's corresponding attribute matching score. Thus, foundation model advisor 408 can rank foundation models in list of recommended foundation models 414 in ascending order from a foundation model having a lowest attribute matching score at a bottom of the list to a foundation model having a highest attribute matching score at a top of the list. Alternatively, foundation model advisor 408 can rank foundation models in list of recommended foundation models 414 in descending order. Justification 418 provides a reason or explanation using natural language processing as to why general-purpose foundation model 302 selected each particular foundation model to be included in list of recommended foundation models 414.

Figure 5B:
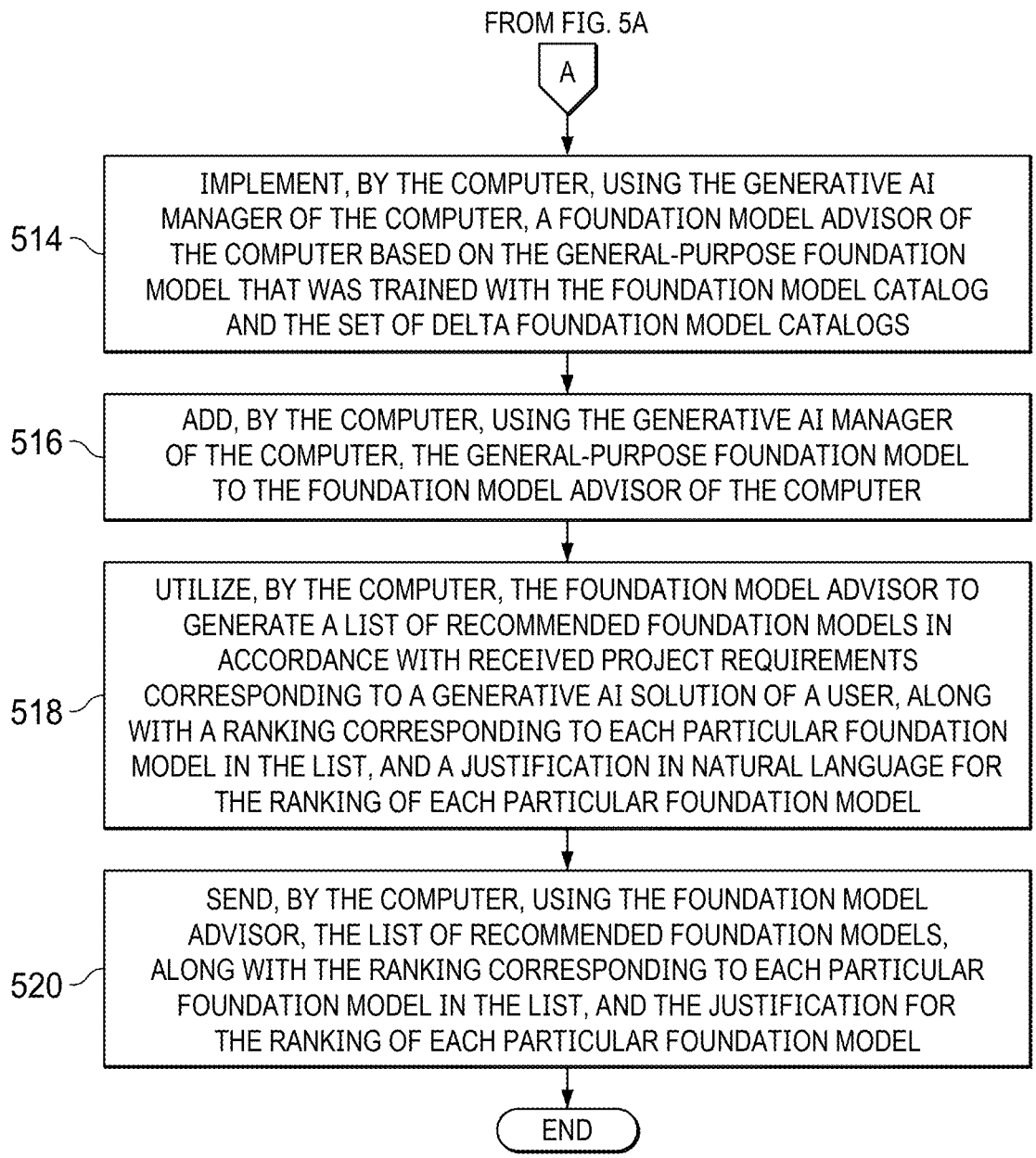

With reference now to FIGS. 5A-5B, a flowchart illustrating a process for implementing a foundation model advisor is shown in accordance with an illustrative embodiment. The process shown in FIGS. 5A-5B may be implemented in a computer, such as, for example, computer 101 in FIG. 1. For example, the process shown in FIGS. 5A-5B may be implemented by foundation model management code 200 in FIG. 1.

The process begins when the computer, using robotic process automation, identifies a plurality of foundation model hubs connected to a public network, each foundation model hub contains a plurality of foundation models along with attributes of corresponding foundation models (step 502). The computer, using the robotic process automation, retrieves a list of foundation models from each respective foundation model hub of the plurality of foundation model hubs along with the attributes of each respective foundation model in response to identifying the plurality of foundation model hubs (step 504).

The computer, using a generative AI manager of the computer, generates a foundation model catalog based on the list of foundation models retrieved from each respective foundation model hub of the plurality of foundation model hubs along with the attributes of each respective foundation model (step 506). The computer, using the generative AI manager, processes the foundation model catalog to remove duplicate foundation model entries in the foundation model catalog (step 508). In addition, the computer, using the generative AI manager, vets the foundation model catalog to ensure AI governance (step 510).

The computer, using the generative AI manager of the computer, trains a general-purpose foundation model of the computer using the foundation model catalog and a set of delta foundation model catalogs (step 512). The computer, using the generative AI manager of the computer, implements a foundation model advisor of the computer based on the general-purpose foundation model that was trained with the foundation model catalog and the set of delta foundation model catalogs (step 514). The computer, using the generative AI manager of the computer, adds the general-purpose foundation model trained with the foundation model catalog and the set of delta foundation model catalogs to the foundation model advisor of the computer (step 516).

The computer utilizes the foundation model advisor to generate a list of recommended foundation models in accordance with received project requirements corresponding to a generative AI solution of a user, along with a ranking corresponding to each particular foundation model in the list, and a justification in natural language for the ranking of each particular foundation model (step 518). The computer, using the foundation model advisor, sends the list of recommended foundation models, along with the ranking corresponding to each particular foundation model in the list, and the justification for the ranking of each particular foundation model (step 520).

Figure 6B:
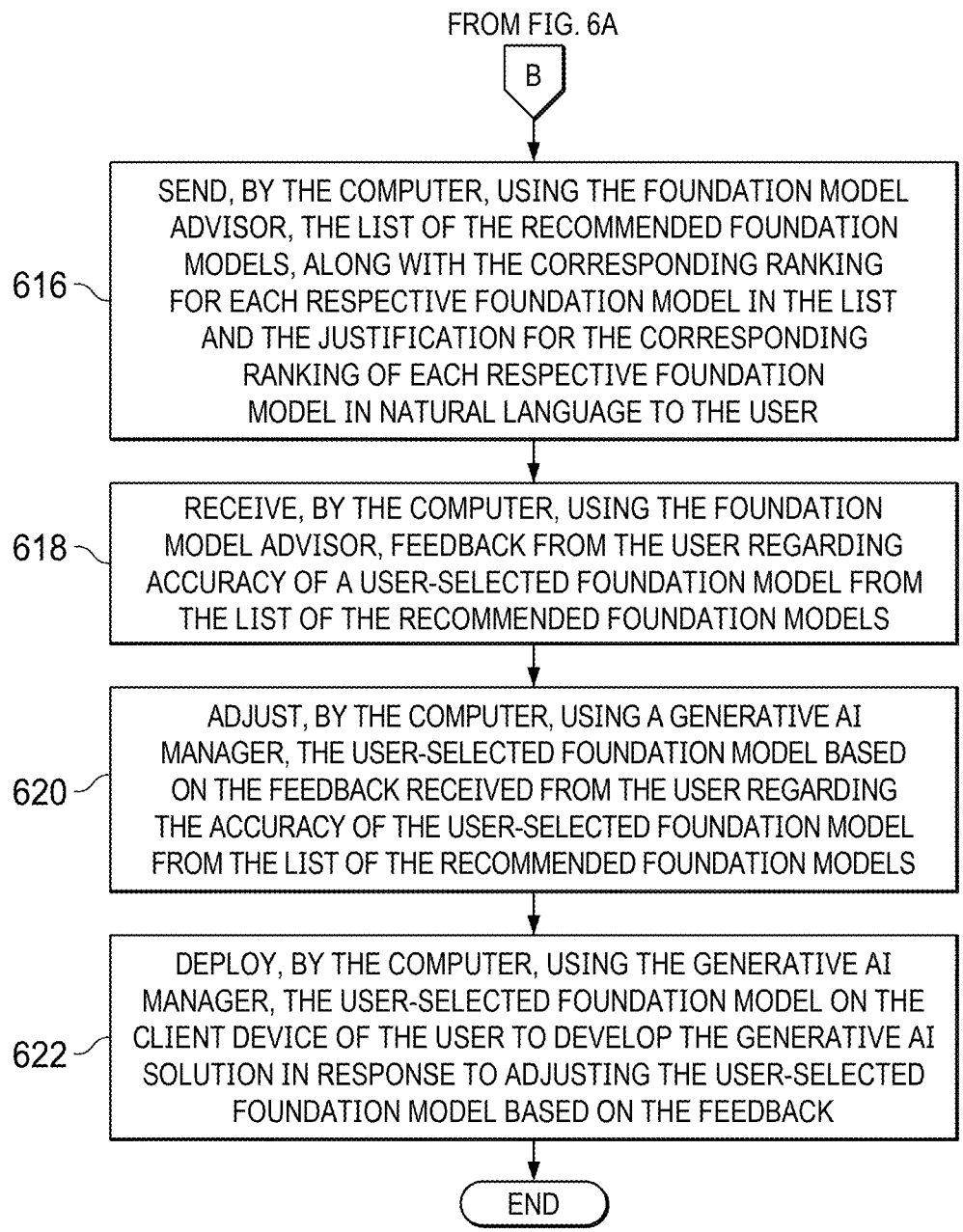

With reference now to FIGS. 6A-6B, a flowchart illustrating a process for automatically recommending appropriate foundation models for generative AI solution development is shown in accordance with an illustrative embodiment. The process shown in FIGS. 6A-6B may be implemented in a computer, such as, for example, computer 101 in FIG. 1. For example, the process shown in FIGS. 6A-6B may be implemented by foundation model management code 200 in FIG. 1.

The process begins when the computer receives a request to access a foundation model advisor of the computer using valid access credentials satisfying authentication and authorization from a user of a client device (step 602). The computer allows the access to the foundation model advisor by the user based on receiving the valid access credentials (step 604).

Afterward, the computer, using the foundation model advisor, receives project requirements corresponding to a generative AI solution from the user (step 606). The computer, using the foundation model advisor, performs a comparison of the project requirements received from the user with attributes of each respective foundation model of a plurality of foundation models contained in a foundation model catalog to inference foundation model recommendations (step 608).

The computer, using the foundation model advisor, generates an attribute matching score for each respective foundation model of the plurality of foundation models contained in the foundation model catalog based on the comparison of the project requirements received from the user with the attributes of each respective foundation model (step 610). The computer, using the foundation model advisor, selects recommended foundation models having a corresponding attribute matching score greater than a predefined minimum attribute matching score threshold level (step 612).

The computer, using the foundation model advisor, generates a list of the recommended foundation models, along with a corresponding ranking for each respective foundation model in the list based on the corresponding attribute matching score and justification for the corresponding ranking of each respective foundation model in natural language (step 614). The computer, using the foundation model advisor, sends the list of the recommended foundation models, along with the corresponding ranking for each respective foundation model in the list and the justification for the corresponding ranking of each respective foundation model in natural language to the user (step 616).

Subsequently, the computer, using the foundation model advisor, receives feedback from the user regarding accuracy of a user-selected foundation model from the list of the recommended foundation models (step 618). The computer, using a generative AI manager, adjusts the user-selected foundation model based on the feedback received from the user regarding the accuracy of the user-selected foundation model from the list of the recommended foundation models (step 620). The computer, using the generative AI manager, deploys the user-selected foundation model on the client device of the user to develop the generative AI solution in response to adjusting the user-selected foundation model based on the feedback (step 622). Thereafter, the process terminates.

Thus, illustrative embodiments of the present disclosure provide a computer-implemented method, computer system, and computer program product for recommending appropriate foundation models in accordance with project requirements for generative AI solution development. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically recommending appropriate foundation models, the computer-implemented method comprising:

generating, by a computer, using a foundation model advisor, a list of recommended foundation models, along with a corresponding ranking for each respective foundation model in the list based on a corresponding attribute matching score and a justification for the corresponding ranking of each respective foundation model;
determining a subset of foundation models based on the justification to form the list of recommended foundation models;
in response to the determining the subset of foundation models,
sending, by the computer, using the foundation model advisor, the list of the recommended foundation models, along with the corresponding ranking for each respective foundation model in the list and the justification for the corresponding ranking of each respective foundation model to a user;
receiving, by the computer, using the foundation model advisor, feedback from the user regarding accuracy of a user-selected foundation model from the list of the recommended foundation models; and
adjusting, by the computer, using a generative AI manager, the user-selected foundation model based on the feedback received from the user regarding the accuracy of the user-selected foundation model from the list of the recommended foundation models.

2. The computer-implemented method of claim 1, further comprising:
deploying, by the computer, using the generative AI manager, the user-selected foundation model on a client device of the user to develop a generative AI solution in response to adjusting the user-selected foundation model based on the feedback.

3. The computer-implemented method of claim 1, further comprising:
receiving, by the computer, using the foundation model advisor, project requirements corresponding to a generative AI solution from the user; and
performing, by the computer, using the foundation model advisor, a comparison of the project requirements received from the user with attributes of each respective foundation model of a plurality of foundation models contained in a foundation model catalog.

4. The computer-implemented method of claim 3, further comprising:
generating, by the computer, using the foundation model advisor, an attribute matching score for each respective foundation model of the plurality of foundation models contained in the foundation model catalog based on the comparison of the project requirements received from the user with the attributes of each respective foundation model; and
selecting, by the computer, using the foundation model advisor, the recommended foundation models having the corresponding attribute matching score greater than a predefined minimum attribute matching score threshold level.

5. The computer-implemented method of claim 1, further comprising:
identifying, by the computer, using robotic process automation, a plurality of foundation model hubs, each foundation model hub contains a plurality of foundation models along with attributes of corresponding foundation models;
retrieving, by the computer, using the robotic process automation, a list of foundation models from each respective foundation model hub of the plurality of foundation model hubs along with the attributes of each respective foundation model in response to identifying the plurality of foundation model hubs; and
generating, by the computer, using the generative AI manager of the computer, a foundation model catalog based on the list of foundation models retrieved from each respective foundation model hub of the plurality of foundation model hubs along with the attributes of each respective foundation model.

6. The computer-implemented method of claim 5, further comprising:
training, by the computer, using the generative AI manager of the computer, a general-purpose foundation model of the computer using the foundation model catalog.

7. The computer-implemented method of claim 6, further comprising:
implementing, by the computer, using the generative AI manager of the computer, the foundation model advisor of the computer based on the general-purpose foundation model that was trained with the foundation model catalog; and
adding, by the computer, using the generative AI manager of the computer, the general-purpose foundation model to the foundation model advisor of the computer.

8. The computer-implemented method of claim 6, further comprising:
utilizing, by the computer, the foundation model advisor to generate the list of the recommended foundation models in accordance with received project requirements, along with a ranking corresponding to each particular foundation model in the list, and the justification in natural language for the ranking of each particular foundation model.

9. A computer system for automatically recommending appropriate foundation models, the computer system comprising:
a communication fabric;
a set of computer-readable storage media connected to the communication fabric, wherein the set of computer-readable storage media collectively stores program instructions; and
a set of processors connected to the communication fabric, wherein the set of processors executes the program instructions to:
generate, using a foundation model advisor, a list of recommended foundation models, along with a corresponding ranking for each respective foundation model in the list based on a corresponding attribute matching score and a justification for the corresponding ranking of each respective foundation model;
determining a subset of foundation models based on the justification to form the list of recommended foundation models;
in response to the determining the subset of foundation models,
send, using the foundation model advisor, the list of the recommended foundation models, along with the corresponding ranking for each respective foundation model in the list and the justification for the corresponding ranking of each respective foundation model to a user;
receive, using the foundation model advisor, feedback from the user regarding accuracy of a user-selected foundation model from the list of the recommended foundation models; and
adjust, using a generative AI manager, the user-selected foundation model based on the feedback received from the user regarding the accuracy of the user-selected foundation model from the list of the recommended foundation models.

10. The computer system of claim 9, wherein the set of processors further executes the program instructions to:
deploy, using the generative AI manager, the user-selected foundation model on a client device of the user to develop a generative AI solution in response to adjusting the user-selected foundation model based on the feedback.

11. The computer system of claim 9, wherein the set of processors further executes the program instructions to:
receive, using the foundation model advisor, project requirements corresponding to a generative AI solution from the user; and
perform, using the foundation model advisor, a comparison of the project requirements received from the user with attributes of each respective foundation model of a plurality of foundation models contained in a foundation model catalog.

12. The computer system of claim 11, wherein the set of processors further executes the program instructions to:
generate, using the foundation model advisor, an attribute matching score for each respective foundation model of the plurality of foundation models contained in the foundation model catalog based on the comparison of the project requirements from the user with the attributes of each respective foundation model; and
select, using the foundation model advisor, the recommended foundation models having the corresponding attribute matching score greater than a predefined minimum attribute matching score threshold level.

13. The computer system of claim 9, wherein the set of processors further executes the program instructions to:
identify, using robotic process automation, a plurality of foundation model hubs, each foundation model hub contains a plurality of foundation models along with attributes of corresponding foundation models;
retrieve, using the robotic process automation, a list of foundation models from each respective foundation model hub of the plurality of foundation model hubs along with the attributes of each respective foundation model in response to identifying the plurality of foundation model hubs; and
generate, using the generative AI manager of the computer system, a foundation model catalog based on the list of foundation models retrieved from each respective foundation model hub of the plurality of foundation model hubs along with the attributes of each respective foundation model.

14. The computer system of claim 13, wherein the set of processors further executes the program instructions to:
train, using the generative AI manager of the computer system, a general-purpose foundation model of the computer system using the foundation model catalog.

15. A computer program product for automatically recommending appropriate foundation models, the computer program product comprising a set of computer-readable storage media having program instructions collectively stored therein, the program instructions executable by a computer to cause the computer to:
generate, using a foundation model advisor, a list of recommended foundation models, along with a corresponding ranking for each respective foundation model in the list based on a corresponding attribute matching score and a justification for the corresponding ranking of each respective foundation model;
determining a subset of foundation models based on the justification to form the list of recommended foundation models;
in response to the determining the subset of foundation models,
send, using the foundation model advisor, the list of the recommended foundation models, along with the corresponding ranking for each respective foundation model in the list and the justification for the corresponding ranking of each respective foundation model to a user;
receive, using the foundation model advisor, feedback from the user regarding accuracy of a user-selected foundation model from the list of the recommended foundation models; and
adjust, using a generative AI manager, the user-selected foundation model based on the feedback received from the user regarding the accuracy of the user-selected foundation model from the list of the recommended foundation models.

16. The computer program product of claim 15, wherein the program instructions further cause the computer to:
deploy, using the generative AI manager, the user-selected foundation model on a client device of the user to develop a generative AI solution in response to adjusting the user-selected foundation model based on the feedback.

17. The computer program product of claim 15, wherein the program instructions further cause the computer to:
receive, using the foundation model advisor, project requirements corresponding to a generative AI solution from the user; and
perform, using the foundation model advisor, a comparison of the project requirements received from the user with attributes of each respective foundation model of a plurality of foundation models contained in a foundation model catalog.

18. The computer program product of claim 17, wherein the program instructions further cause the computer to:
generate, using the foundation model advisor, an attribute matching score for each respective foundation model of the plurality of foundation models contained in the foundation model catalog based on the comparison of the project requirements received from the user with the attributes of each respective foundation model; and
select, using the foundation model advisor, the recommended foundation models having the corresponding attribute matching score greater than a predefined minimum attribute matching score threshold level.

19. The computer program product of claim 15, wherein the program instructions further cause the computer to:
identify, using robotic process automation, a plurality of foundation model hubs, each foundation model hub contains a plurality of foundation models along with attributes of corresponding foundation models;
retrieve, using the robotic process automation, a list of foundation models from each respective foundation model hub of the plurality of foundation model hubs along with the attributes of each respective foundation model in response to identifying the plurality of foundation model hubs; and
generate, using the generative AI manager of the computer, a foundation model catalog based on the list of foundation models retrieved from each respective foundation model hub of the plurality of foundation model hubs along with the attributes of each respective foundation model.

20. The computer program product of claim 19, wherein the program instructions further cause the computer to:
    train, using the generative AI manager of the computer, a general-purpose foundation model of the computer using the foundation model catalog.

\* \* \* \* \*